Figure 1:
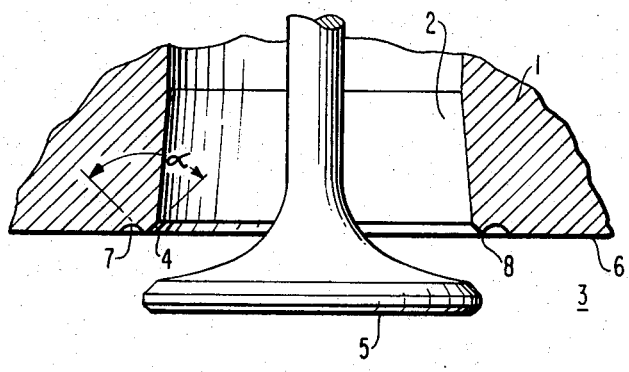

United States Patent [19] [15] 3,693,606
Hardenberg [45] Sept. 26, 1972

[54] VALVE SEAT FOR AN INLET VALVE OF MIXTURE-INDUCING INTERNAL COMBUSTION ENGINES

[72] Inventor: Horst Hardenberg, Stuttgart-Unterturkheim, Germany

[73] Assignee: Daimler-Benz Aktiengesellschaft, Stuttgart-Unterturkheim, Germany

[22] Filed: Aug. 15, 1969

[21] Appl. No.: 850,536

[30] Foreign Application Priority Data

Aug. 16, 1968 Germany..........P 17 51 908.3

[52] U.S. Cl............123/141, 123/191 R, 123/188 S, 123/188 M, 123/188 AF
[51] Int. Cl........F02m 29/00, F01l 3/00, F02b 23/00
[58] Field of Search..........123/188, 191, 141, 31, 33; 48/180 M, 180 C

[56] References Cited

UNITED STATES PATENTS

| 408,460 | 8/1889 | Capitaine | 123/31 |
|---|---|---|---|
| 800,777 | 10/1905 | Westmacott | 48/180 |
| 1,031,753 | 7/1912 | Westaway | 123/141 |
| 1,340,062 | 5/1920 | Lapham | 123/141 |
| 1,512,952 | 10/1924 | Secor | 48/180 |
| 1,526,963 | 2/1925 | Chandler | 48/180 |
| 1,969,202 | 8/1934 | Bugand | 48/180 |
| 2,248,989 | 7/1941 | Hanson | 123/191 C |
| 3,025,840 | 3/1962 | Casini | 123/191 |
| 3,316,888 | 5/1967 | Bachle | 123/191 |
| 3,364,911 | 1/1968 | Baudry | 123/191 |
| 2,174,337 | 9/1939 | Welsmiller et al. | 123/188 |
| 2,178,895 | 11/1939 | Myers | 123/188 |
| 2,696,810 | 12/1954 | Kuepfer | 123/188 |
| 3,428,035 | 2/1969 | Stefan et al. | 123/188 |

FOREIGN PATENTS OR APPLICATIONS

| 3,927 | 2/1900 | Great Britain | 123/25.31 |
|---|---|---|---|
| 150,001 | 8/1920 | Great Britain | 123/33 |
| 581,051 | 11/1927 | France | 123/31 |
| 872,478 | 8/1940 | France | 48/180 |
| 214,823 | 8/1908 | Germany | 48/180 |
| 201,869 | 4/1923 | Great Britain | 123/188 |
| 457,712 | 9/1913 | France | 123/188 |
| 195,728 | 3/1906 | Germany | 123/188 |
| 409,267 | 8/1942 | Italy | 123/188 |
| 246,081 | 11/1944 | Switzerland | 123/188 |

Primary Examiner—Laurence M. Goodridge
Assistant Examiner—Ronald B. Cox
Attorney—Craig, Antonelli and Hill

[57] ABSTRACT

An internal combustion engine which draws-in a fuel-air mixture through the inlet channel controlled by an inlet valve, in which the valve seat is constructed as a flow-disruption edge in order to minimize the overflow of liquid fuel from the walls of the inlet channel into the walls of the combustion space.

16 Claims, 2 Drawing Figures

INVENTOR
HORST HARDENBERG

BY Craig, Antonelli, Stewart & Hill
ATTORNEYS

VALVE SEAT FOR AN INLET VALVE OF MIXTURE-INDUCING INTERNAL COMBUSTION ENGINES

The present invention relates to a valve seat for inlet valves of mixture-inducing internal combustion engines.

The exhaust gases of internal combustion engines of the aforementioned type should contain as small as possible an amount in harmful materials. To these harmful materials belong different hydrocarbon compounds which are contained in the fuel and which reach the exhaust gases uncombusted. A considerable portion of the hydrocarbon compounds remain uncombusted or non-combusted for the reason that a portion of the fuel flows in liquid form by way of the wall of the inlet channel and the valve seat for the inlet valve into the combustion space and remains at the wall thereof. The wall cools the fuel so that the evaporation thereof and the subsequent combustion are far-reachingly impaired and prevented. During the opening of the outlet valve, the fuel clinging to or remaining at the combustion space wall is torn along by the outflowing exhaust gases into the exhaust channel or flows into the exhaust channel by way of the valve seat for the exhaust valve. This phenomenon occurs in all internal combustion engines in which the fuel is supplied to the combustion space by way of the inlet channel, i.e., in engines with carburetor or injection of the fuel into the inlet channel with or without supercharging.

The present invention is based on the aim to decrease the proportion of uncombusted hydrocarbon compounds in the exhaust gas in that the deposit of liquid fuel at the combustion space wall is eliminated either entirely or is prevented at least partially.

The underlying problems are solved by the present invention in that the outer circumference of the valve seat for the inlet valve is constructed as flow-disruption edge. This flow-disruption edge precludes an overflowing of the fuel film, flowing along the wall of the inlet channel as well as along the valve seat, to the wall of the combustion space, especially to the wall of the cylinder head on the side of the combustion space. The liquid fuel, instead, is detached from the flow-disruption edge by the air flowing into the combustion space and is torn along. The fuel is thereby prepared and its combustion is made possible so that it can no longer occur as harmful material in the exhaust gases.

In an advantageous construction of the present invention, the edge angle of the flow-disruption edge amounts to about 90°. As a result thereof, it is achieved that the valve seat is neither essentially weakened nor the flow-disruption edge extends too far into the combustion space without the possibility of the fuel film flowing around the flow-disruption edge.

Accordingly, it is an object of the present invention to provide a valve seat for the inlet valve of mixture-inducing internal combustion engines which avoids by simple means the aforementioned shortcomings and drawbacks encountered in the prior art.

Another object of the present invention resides in a mixture-inducing internal combustion engine which produces fewer noxious components in the exhaust gases thereof without the need for complicated or costly devices.

A further object of the present invention resides in a valve seat for the inlet valve of a mixture-inducing internal combustion engine which previous fuel, flowing along the intake channel, from flowing over into the combustion space along the valve seat and combustion space walls thereof.

Figure 2:
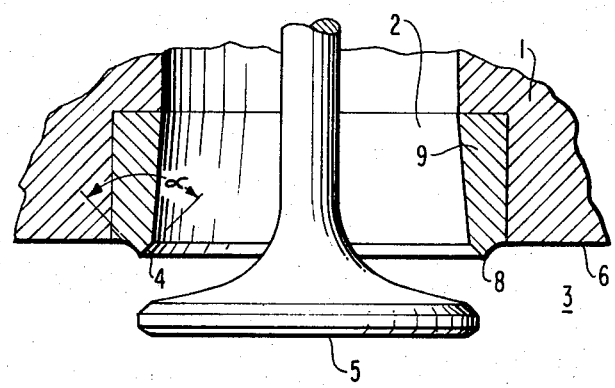

These and further objects, features and advantages of the present invention will become more obvious from the following description when taken in connection with the accompanying drawing which shows, for purposes of illustration only, two embodiments in accordance with the present invention, and wherein:

FIG. 1 is a partial cross-sectional view through a cylinder head in accordance with the present invention within the area of the inlet channel thereof; and FIG. 2 is a partial cross-sectional view through a modified embodiment of a cylinder head within the area of the inlet channel and provided with a valve seat ring in accordance with the present invention.

Referring now to the drawing wherein like reference numerals are used throughout the two views to designate like parts, and more particularly to FIG. 1, there is provided in the cylinder head 1 an inlet channel 2 which has in its lower portion a shape slightly conically enlarged in the direction toward the combustion space 3. The wall of the inlet channel 2 passes over just shortly in front of the combustion space 3 into a valve seat 4 for an inlet valve 5 which is illustrated in the open condition. The valve seat 4 which is constructed as truncated cone, has an angle of 45° with respect to the wall 6 of the cylinder head 1 on the side of the combustion space.

In the embodiment according to FIG. 1, the valve seat 4 is arranged directly at the cylinder head 1. Concentrically to the valve seat 4 there is provided in the wall 6 of the cylinder head 1 a recess 7 constructed as groove which directly adjoins the valve seat 4 in the radial direction thereof. As a result thereof, the outer circumference of the valve seat 4 is constructed as circularly shaped flow-disruption edge 8 which is disposed in the plane of the wall 6. Since the groove 7 has, on the radial inner side, an angle of 45° with respect to the wall, the edge angle $\alpha$ of the flow-disruption edge 8 amounts to 90°. An unnecessary weakening of the cylinder head 1 within the area of the valve seat 4 is avoided by this angle $\alpha$ and the sufficiently small dimension of the groove 7 whereas an overflowing of the fuel film from the valve seat 4 to the wall 6 is prevented.

In the embodiment according to FIG. 2, the valve seat 4 is arranged at a valve seat ring 9 which is inserted into the cylinder head 1 whereby the valve seat ring 9 projects slightly beyond the wall 6 into the combustion space 3. The flow-disruption edge 8 is formed between the valve seat 4 and the continuous transition between the valve seat ring 9 and the wall 6 approximately in the form of a quarter circle. The flow-disruption edge 8 has an edge angle $\alpha$ of about 90° as in the embodiment according to FIG. 1.

While I have shown and described only two embodiments in accordance with the present invention, it is understood that the same is not limited thereto but is susceptible of numerous changes and modifications as known to a person skilled in the art, and I therefore do not wish to be limited to the details shown and

I claim:

1. A valve seat for a suspended inlet valve of a mixture-inducing internal combustion engine of overhead-type with a combustion chamber delimited by a wall of a cylinder head, characterized in that the valve seat forms a seating surface for the inlet valve which directly terminates at its lower end in a continuous flow-disruption edge means substantially preventing the flow of fuel into the portions of the valve seat disposed radially outwardly of the flow-disruption edge means, the edge angle of said flow-disruption edge means formed by two converging surfaces being about 90°, said flow-disruption edge means extending over the entire circumference of the valve seat with the sharp edge pointing downwardly in the direction of the combustion chamber, and the valve seating surface which constitutes one of said converging surfaces forming a substantial angle to the axis of the inlet valve which is of the order of 45° so that the flow-disruption edge means is defined by two converging surfaces, as seen in cross section, which form each an angle to the cylinder head wall whereby no wall surfaces exist between the flow-disruption edge means and the walls delimiting the combustion space along which the fuel might re-deposit and substantially no surfaces exist between the seating surface and the flow-disruption edge means along which the fuel might combust.

2. A valve seat according to claim 1, characterized in that the flow-disruption edge means forms a well defined, sharp edge pointing in the direction of the combustion chamber and delimited by tapering wall portions converging toward one another.

3. A valve seat according to claim 2, characterized in that the tip of the flow-disruption edge means is disposed substantially in the plane of the cylinder head wall facing the cylinder space.

4. A valve seat according to claim 2, characterized in that the flow disruption edge means projects slightly into the combustion space beyond the plane of the lower surface of the cylinder head wall facing the cylinder space.

5. A valve seat according to claim 2, characterized in that the radially outer surface of the flow-disruption edge is formed by an annular groove.

6. A valve seat according to claim 2, characterized in that the radially outer surface of the flow-disruption edge is constituted by a fillet-type surface.

7. A valve seat according to claim 6, characterized in that the fillet-type surface forms approximately a quarter of a circle.

8. A valve seat according to claim 2, characterized in that the valve disc of the valve coordinated to the valve seat approaches very closely the flow-disruption edge means in the closed condition of the valve so that the surface of the valve seat forming one of said wall portions is practically completely covered by the valve disc.

9. A valve seat according to claim 8, characterized in that the tip of the flow-disruption edge means is disposed substantially in the plane of the cylinder head wall facing the cylinder space.

10. A valve seat according to claim 8, characterized in that the flow-disruption edge means projects slightly into the combustion space beyond the plane of the lower surface of the cylinder head wall facing the cylinder space.

11. An internal combustion engine of overhead-type in which a fuel-air mixture is sucked into the cylinder space through an inlet channel controlled by a suspended inlet valve, characterized by a valve seat means in the cylinder head of the engine minimizing flow obstructions and having a sealing surface for said inlet valve which directly terminates in an annular flow-disruption edge means at its downstream end—as viewed in the normal direction of flow of the mixture—to reduce the content of harmful hydrocarbon compounds in the exhaust gases by minimizing the overflow of liquid fuel from the walls of the inlet channel to the walls of the combustion space, said flow-disruption edge means forming an edge angle of about 90° by two wall surfaces converging toward one another in the direction toward the cylinder space whereby the tip of the edge angle points downwardly in the direction of the combustion space, the inner wall surface of said two wall surfaces, forming also the valve seating surface, subtending a substantial angle with respect to the axis of the inlet valve that is at least of the order of 45° so that the outer wall surface which also subtends an angle of complementary magnitude with respect to a cylinder head wall surface into which said outer wall surface merges and which is approximately perpendicular to the inlet valve axis, effectively precludes the existence of any surfaces along which fuel might re-deposit after being torn off from said flow disruption edge means, and the valve disc of said inlet valve closely approaching in the closed condition thereof said inner surface so that the valve seat surface is nearly completely covered by said valve disc whereby substantially no surfaces exist between the seating surface and the flow-disruption edge means along which the fuel might combust.

12. An internal combustion engine according to claim 11, characterized in that the flow-disruption edge means is substantially flush with the bottom surface of the cylinder head facing the combustion space.

13. An internal combustion engine according to claim 11, characterized in that the flow-disruption edge means slightly projects beyond the bottom wall of the cylinder head facing the combustion space.

14. An internal combustion engine according to claim 11, characterized in that the valve seat means together with the flow-disruption edge means is formed on an insert member inserted into the cylinder head.

15. An internal combustion engine according to claim 14, characterized in that the insert member forms an inlet channel section that is enlarged in the direction toward the combustion space in the form of a truncated cone.

16. An internal combustion engine according to claim 11, characterized in that the valve seat means together with the flow-disruption edge means is formed directly in the cylinder head.

* * * * *